United States Patent
Pichl et al.

(10) Patent No.: US 9,481,817 B2
(45) Date of Patent: *Nov. 1, 2016

(54) COMPOSITION FOR THE PRODUCTION OF SILICONE RUBBER MATERIALS

(71) Applicant: Nitrochemie Aschau GmbH, Aschau am Inn (DE)

(72) Inventors: Ulrich Pichl, Aschau (DE); Gerhard Schmidt, Muhldorf a. Inn (DE); Theodor Ederer, Zangberg (DE); Thomas Knott, Muhldorf (DE); Karl-Christian Bart, Ampfing (DE); Jorg Lippstreu, Munich (DE)

(73) Assignee: Nitrochemie Aschau GmbH, Aschau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,629

(22) PCT Filed: Mar. 4, 2014

(86) PCT No.: PCT/EP2014/000538
§ 371 (c)(1),
(2) Date: Aug. 31, 2015

(87) PCT Pub. No.: WO2014/135261
PCT Pub. Date: Sep. 12, 2014

(65) Prior Publication Data
US 2016/0017195 A1    Jan. 21, 2016

(30) Foreign Application Priority Data

Mar. 4, 2013    (EP) ...................................... 13001089

(51) Int. Cl.
| | | |
|---|---|---|
| *C09J 183/04* | (2006.01) | |
| *B01J 31/04* | (2006.01) | |
| *B01J 31/12* | (2006.01) | |
| *C09D 183/04* | (2006.01) | |
| *C08L 83/04* | (2006.01) | |
| *C08K 5/5419* | (2006.01) | |

(52) U.S. Cl.
CPC .............. *C09J 183/04* (2013.01); *B01J 31/04* (2013.01); *B01J 31/12* (2013.01); *B01J 31/128* (2013.01); *C08K 5/5419* (2013.01); *C08L 83/04* (2013.01); *C09D 183/04* (2013.01); *B01J 2231/14* (2013.01); *B01J 2531/23* (2013.01); *B01J 2531/26* (2013.01); *B01J 2531/54* (2013.01)

(58) Field of Classification Search
None
See application file for complete search history.

(56) References Cited

U.S. PATENT DOCUMENTS

| | | | |
|---|---|---|---|
| 2007/0191541 A1 | 8/2007 | Guennouni et al. | |
| 2010/0152373 A1* | 6/2010 | Wakabayashi | C08G 65/2609 524/588 |
| 2010/0225069 A1* | 9/2010 | Haas | C08K 5/3155 277/591 |
| 2010/0234510 A1* | 9/2010 | Feder | C08K 5/09 524/423 |
| 2012/0016072 A1* | 1/2012 | Ederer | C07F 7/1836 524/588 |

FOREIGN PATENT DOCUMENTS

| | | | |
|---|---|---|---|
| EP | 2030976 | 3/2009 | |
| EP | 2280041 | 2/2011 | |
| WO | WO 2013101751 A1 * | 7/2013 | .............. C08L 83/04 |

OTHER PUBLICATIONS

Written Opinion of the International Searching Authority; International Application No. PCT/EP2014/000538; dated Jun. 23, 2014; 6 pages.
International Search Report; International Application No. PCT/EP2014/000538; dated Jun. 23, 2014; 5 pages.
International Preliminary Report on Patentability; International Application No. PCT/EP2014/000538; dated Sep. 8, 2015; 6 pages.
China Patent Office Action, dated May 10, 2016, in App. No. 201480012020.9, with English translation, 12 pages.
China Patent Application No. CN1826375 A and English translation of the Abstract of the priority French application FR2856694; 35 pages.

* cited by examiner

*Primary Examiner* — Robert S Loewe
(74) *Attorney, Agent, or Firm* — Thomas & Karceski, P.C.

(57) ABSTRACT

The present invention relates to a catalyst for the cross-linking of silicone rubber materials with a cross-linker on the basis of lactate. In particular, the present invention provides a composition for the production of a silicone rubber material with a cross-linker on the basis of lactate, wherein the composition comprises a catalyst, which comprises at least two compounds, which are different from each other and which are selected independently of each other from metal salts of carboxylic acids. In addition, the present invention provides a method for the production of such a composition, as well as a use of the catalyst for the cross-linking of a silicone rubber material, in particular for cross-linking a silicone rubber material with a cross-linker on the basis of lactate, as well as a use of the composition of the present invention for the production of a silicone rubber material, in particular for use as a sealant, an adhesive, or a coating agent.

27 Claims, No Drawings

COMPOSITION FOR THE PRODUCTION OF SILICONE RUBBER MATERIALS

CROSS-REFERENCE TO RELATED APPLICATIONS

This is a National Stage Entry into the United States Patent and Trademark Office from International PCT Patent Application No. PCT/EP2014/000538 having an international filing date of Mar. 4, 2014, and European Patent No. 13001089.5 filed Mar. 4, 2013, both of the contents of which are incorporated herein by reference.

The present invention relates to a catalyst for the cross-linking of silicone rubber materials with a cross-linker on the basis of lactate. In particular, the present invention provides a composition for the production of a silicone rubber material with a cross-linker on the basis of lactate, wherein the composition comprises a catalyst, which comprises at least two compounds, which are different from each other and which are selected independently of each other from metal salts of carboxylic acids. In addition, the present invention provides a method for the production of such a composition, as well as a use of the catalyst for the cross-linking of a silicone rubber material, in particular for cross-linking a silicone rubber material with a cross-linker on the basis of lactate, as well as a use of the composition of the present invention for the production of a silicone rubber material, in particular for use as a sealant, an adhesive, or a coating agent.

BACKGROUND OF THE INVENTION

Cold-curing silicone rubber materials, also referred to as "RTV" (from German "Raumtemperatur-vernetzende"=cross-linking at room temperature) silicone rubber materials, have been known for quite some time as custom-designed materials which have elastic properties. They are used, generally, as sealants or adhesives for glass, porcelain, ceramics, stone, plastics, metals, wood, etc., e.g. in applications like joint filling and sealing compounds in construction and sanitary installations, or as coating agents, e.g. in the electronics industry (Römpp Chemie Lexikon, CD ROM, version 2.0, ed. J. Falbe, Thieme-Verlag, Stuttgart 1999; as well as Ullmanns Enzyklopädie der Technischen Chemie, 4th edition, ed. E. Bartholome, Verlag Chemie, Weinheim 1982, vol. 21, p. 511 et seq.). Use is made especially of single-component RTV silicone rubber materials (RTV-1); These are, for example, plastically mouldable mixtures made of $\alpha,\omega$-dihydroxy-polyorganosiloxanes and appropriate cross-linkers (also referred to as cross-linking agents or hardeners in the art), which are suitable for storing under exclusion of moisture (e.g. within a suitable cartridge) but polymerize under the influence of water or humidity of the air at room temperature. Polymerization, as a rule, takes place by condensation of SiOH groups with appropriate hydrolyzable SiX groups of the cross-linkers.

Depending on the desired chemical and physical properties of the polymerization product, such as, e.g., the desired degree of cross-linking, the solvent resistance, etc., various polyfunctional cross-linkers (hardeners), e.g. tri-functional and/or tetra-functional cross-linkers (hardeners), are usually used together with various polyorganosiloxanes which either are difunctional or carry more functional groups. The most frequently chosen difunctional polyorganosiloxane compounds are $\alpha,\omega$-dihydroxy-polyorganosiloxanes.

Based on the leaving groups (HX) released by the hydrolysis of the cross-linker, a distinction is made with RTV-1 silicone rubber materials between acid systems (HX=acids, such as, e.g., acetic acid, etc.), basic systems (e.g. HX=amines, etc.), and neutral systems (e.g. HX=alcohols, oximes, etc.). RTV-1 silicone rubber materials which are commercially available at this time usually comprise acid systems which hydrolyze with release of acetic acid, or neutral systems which hydrolyze with release of oxime compounds, such as, e.g., butan-2-one oxime (or methyl-ethyl-ketoxime, MEKO, respectively).

Since, when cross-linking, acid RTV-1 rubber materials release acetic acid, which as an aggressive compound has the potential of corroding or decomposing, for example, metals, stone, or mortar, and is additionally associated with a considerable problem of smell, neutrally cross-linking oximosilane cross-linkers, which hydrolyze with release of oxime compounds, such as, e.g., butan-2-one oxime (or methyl-ethyl-ketoxime, MEKO, respectively), are often used for RTV-1 silicone rubber materials at this time.

Yet butan-2-one oxime may cause cancer, as has been discovered recently. Therefore, any further use of compounds releasing butan-2-one oxime, on principle, forbids itself for health reasons. That is why, since 2004, butan-2-one oxime must be labelled by the R phrase (risk phrase) "R40" ("suspected of having cancerogenic effects"). As a consequence, also silicone rubber materials must be thus labelled if they contain free butan-2-one oxime in a concentration above a certain threshold. The labelling requirement particularly includes silicone rubber materials like, for example, the ones contained in sealant cartridges, unless the free content of butan-2-one oxime is less than 1% (cf. "mixing rule" of the preparation directive, Directive 2006/8/EG of the Commission of Jan. 23, 2006, published in the Official Journal of the European Union of Jan. 24, 2006).

Practically all of the conventional cross-linkers mentioned above suffer from another disadvantage, also under health aspects, namely that the compounds released during cross-linking smell awful, sometimes extremely awful, which causes great discomfort, especially, when working with them in closed spaces.

In view of those disadvantages of the conventional cross-linkers, the inventors of the present invention have previously invented a new cross-linker (hardener) on the basis of lactate, in particular on the basis of ethyllactate, which provides a cross-linker, which is non-toxic and does not smell bad, and which does not release aggressive compounds upon cross-linking. This cross-linker is described in detail in EP 2 030 976 A1.

For the desired broad application range of the silicone rubber materials, these should adhere to as many surfaces as possible, such as, e.g., to wood, varnished wood, glazed wood, metals, such as steel, aluminium, powder-coated aluminium, glass, plastics, such as polyvinylchloride (PVC), polyamide, concrete, etc. Moreover, it is important that the silicone rubber materials polymerize as completely as possible in order to prevent a subsequent "bleeding" of incompletely reacted starting materials, etc. In addition, the silicone rubber materials should be stable in storage within an ordinary cartridge, i.e. their properties should not change in dependence of the storage time; preferably, both in a cartridge sealed after filling, and in a cartridge that is already opened and/or partially emptied. Finally, the polymerization product obtained after complete cross-linking (cure) of the silicone rubber material should be transparent or clear, respectively.

Apart from the appropriate selection of the actual components of the polymer, such as cross-linker and polyorganosiloxane, for controlling the polymerization rate and/or polymerization degree, a catalyst is usually added, by which important product properties of the silicone rubber materials are influenced, such as, e.g., the skin formation time (i.e. the time, at which a first complete skin is formed on an applied material), the tack free time (i.e. the time, after which the material no longer exhibits tackiness), the complete cure (i.e. the time, at which the polymerization is completed), etc. For example, the following properties are expected from commercial silicone sealing compounds: a skin formation time of 5 to 15 minutes, a tack free time of 15 to 120 minutes, and a complete cure of maximal 7 days upon application with a height of 10 mm. Further information regarding the skin formation time, tack free time and complete cure can be taken, e.g., from the "Praxishandbuch Dichtstoffe" ($3^{rd}$ edition 1990), which has been published by the Industrieverband Dichtstoffe e.V. (IVD).

Up to now, a metalorganic catalyst was used as a catalyst for silicone rubber materials, such as one ordinarily used for polysiloxanes cross-linking by condensation, in particular a catalyst on the basis of a tin-organic compound, such as, e.g., an alkyl-tin-carboxylate, especially dibutyl-tin-dilaurate and dioctyl-tin-dilaurate. However, such tin-organic compounds exhibit toxicological properties, which have led to the restriction of their use in commercially available products (cf. EU Directive 76/769/EWG of 28.05.2009).

As a replacement, another catalyst, which does not comprise a tin-organic compound, was used for the cross-linking of polysiloxanes in the art so far.

For example, a titanium-based compound can be used as catalyst, as described, e.g., in EP 1 230 298 A1 and EP 2 290 007 A1. However, it is known that a catalyst on the basis of a titanium compound can result in yellowing and/or surface tackiness in the products, and has a slow vulcanizing rate, a wanting storage stability, and an incompatibility with current adhesion promoters (coupling agents) on the basis of aminosilanes.

Moreover, EP 1 230 298 A1 describes a catalyst on the basis of amines and metal salts of tin, zinc, iron, lead, barium, and zirconium, as well as on the basis of chelates of tin. This catalyst results in products having a little yellowing, but is a slow catalyst according to EP 2 290 007 A1.

Therefore, EP 2 290 007 A1 proposes a catalyst on the basis of metal compounds of the I. and II. main and transition groups, i.e. Li, Na, K, Rb, Cs, Be, Mg, Ca, Sr, Ba, Cu, Ag, Au, Zn, Cd, and Hg, in form of pure carboxylates, which result in a product having an acceptable hardening progress upon addition of an acid co-catalyst in form of an organic or inorganic acid. EP 2 290 007 A1 describes the use of this catalyst in silicone rubber materials with cross-linkers (hardeners), which hydrolyze with release of acid (acetic acid) or neutral (alcohols or MEKO, respectively) compounds, respectively, in particular by using a catalyst made from a Li carboxylate or from a Sr carboxylate, respectively.

The use of a catalyst on the basis of Li, Na, K, Mg, Ca, Sr compounds without an additional simultaneous use of an acid co-catalyst is described in EP 2 280 041 A1. Therein, it is further described that in particular the use of Octasoligem lithium or Octasoligem strontium in combination with alkoxy, acetoxy or oximo RTV-1 results in products having desired properties.

Object of the Invention

However, the inventors of the present invention have found that the above-described known tin-free catalysts in combination with a cross-linker (hardener) on the basis of lactate do not result in products (RTV-1) having desired properties. So, it was found that the sealing compounds produced with the known tin-free catalysts have a deficient adhesion to many carriers (substrates), as well as an incomplete cure and an insufficient storage stability. In particular with lithium-containing catalysts, a yellowing of the sealing compounds was observed in storage.

Therefore, it is an object of the invention to provide a catalyst for silicone rubber materials, in particular for the ones comprising a cross-linker on the basis of lactate, which catalyst allows to exploit the numerous, particularly toxicological, advantages of the lactate cross-linkers, and, at the same time, has no toxicity, as have, e.g., catalysts on the basis of tin-organic compounds.

It is known that in highly optimised systems, as the silicone rubber materials are, already slight changes disturb the system and can lead to the deterioration of the entirety of the optimised properties. Therefore, it is an object of the invention to provide an improved catalyst for silicone rubber materials with lactate cross-linkers, which provides all the properties desired for RTV-1, but does not have the disadvantages associated with the prior art.

The object of the invention is solved by the subject-matter of the independent claims. Preferred embodiments are subject-matter of the dependent claims.

SHORT DESCRIPTION OF THE INVENTION

For solving the above-described object, the present invention provides: a composition for the production of a silicone rubber material with a cross-linker on the basis of lactate, wherein the composition comprises a catalyst, which comprises at least two compounds, which are different from each other and which are selected independently of each other from metal salts of carboxylic acids; a method for the production of such a composition; a use of the catalyst for cross-linking a silicone rubber material, in particular for cross-linking a silicone rubber material with a cross-linker on the basis of lactate; as well as a use of the composition according to the invention for the production of a silicone rubber material, in particular for use as a sealant, an adhesive, or a coating agent.

In particular, the present invention provides the following means:

(1) A composition, which comprises
   at least one organosilicone compound,
   at least one cross-linker on the basis of a silane compound having lactate groups, and
   a catalyst, wherein the catalyst comprises at least two compounds, which are different from each other and which are selected independently of each other from metal salts of carboxylic acids.

(2) A composition, as described under item (1) above, which is characterised in that a metal salt of a carboxylic acid comprises at least one metal cation, which is selected from a cation of bismuth, a cation of calcium, a cation of potassium, a cation of lithium, a cation of magnesium, a cation of sodium, and a cation of zinc.

(3) A composition, as described under items (1) or (2) above, which is characterised in that a metal salt of a carboxylic acid comprises one or more carboxylic acid anions, which are selected from anions of saturated and unsaturated carboxylic acids having six to nineteen carbon atoms, wherein the carboxylic acid comprises a straight-chain or branched hydrocarbon chain.

(4) A composition, as described under items (1) to (3) above, which is characterised by comprising a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, preferably a bismuth salt, a calcium salt, and a sodium salt, each of one or more branched saturated carboxylic acids having six to nineteen carbon atoms.

(5) A composition, as described under items (1) to (4) above, which is characterised in that the ratio of the number of zinc atoms of the zinc salt of a carboxylic acid to the number of the metal atoms of the metal salt of a carboxylic acid is from 2:1 to 1:2, preferably from 1.3:1 to 1:1.3.

(6) A composition, as described under items (1) to (5) above, which is characterised by comprising at least one metal salt of a carboxylic acid, which is selected from bismuth-tris(2-ethylhexanoate), Calcium-bis(2-ethylhexanoate), sodium(2-ethylhexanoate), and zinc-bis(2-ethylhexanoate).

(7) A composition, as described under items (1) to (6) above, which is characterised by comprising calcium-bis(2-ethylhexanoate) and zinc-bis(2-ethylhexanoate), preferably in a number ratio of from 1.3:1 to 1:1.3.

(8) A composition, as described under items (1) to (7) above, which is characterised by comprising bismuth-tris(2-ethylhexanoate) and zinc-bis(2-ethylhexanoate), preferably in a number ratio of from 1.3:1 to 1:1.3.

(9) A composition, as described under items (1) to (7) above, which is characterised by comprising sodium(2-ethylhexanoate) and zinc-bis(2-ethylhexanoate), preferably in a number ratio of from 1.3:1 to 1:1.3.

(10) A composition, as described under items (1) to (11) above, which is characterised by additionally comprising a co-catalyst, which is selected from a basic compound, particularly triethylamine.

(11) A composition, as described under items (1) to (10) above, which is characterised in that, prior to mixing with the catalyst, the at least one organosilicone compound and the at least one cross-linker on the basis of a silane compound having lactate groups were mixed and reacted with each other.

(12) A composition, as described under item (11) above, which is characterised in that the at least one organosilicone compound and the at least one cross-linker on the basis of a silane compound having lactate groups were mixed and reacted with each other under addition of a first catalyst, which is selected from an acid compound, in particular at least one 2-ethylhexylphosphate, and in that the composition so-obtained was neutralised by addition of a basic compound, preferably triethylamine, prior to the mixing with the catalyst.

(13) A composition, as described under items (1) to (12) above, which is characterised in that the organosilicone compound comprises an α,ω-dihydroxyl-terminated polyorganosiloxane compound, particularly an α,ω-dihydroxyl-terminated polydialkylsiloxane.

(14) A composition, as described under items (1) to (13) above, which is characterised in that the cross-linker comprises at least one compound, which is selected from the group consisting of methyl-tris(ethyllactato)silane, ethyl-tris(ethyllactato)silane, phenyl-tris(ethyllactato)silane, vinyl-tris(ethyllactato)silane, and tetra(ethyllactato)silane.

(15) A composition, as described under items (1) to (14) above, which is characterised by comprising 40 to 90% by weight of the organosilicone compound, 1 to 15% by weight of the cross-linker, and 0.1 to 5.0% by weight of the catalyst.

(16) A method for the production of a composition, as described under items (1) to (15) above, which is characterised in that, in a first step, at least one organosilicone compound and at least one cross-linker on the basis of a silane compound having lactate groups are mixed and reacted with each other, preferably under addition of a first catalyst, which is selected from an acid compound, in particular at least one 2-ethylhexylphosphate, prior to mixing the so-obtained composition with a catalyst in a subsequent step, wherein the catalyst comprises at least two compounds, which are different from each other and which are selected independently of each other from metal salts of carboxylic acids.

(17) A method, as described under item (16), characterised in that the composition, which is obtained by reaction of the at least one organosilicone compound and the at least one cross-linker on the basis of a silane compound having lactate groups under addition of a first catalyst, is netralised by addition of a basic compound, preferably triethylamine, prior to mixing with the catalyst.

(18) A use of a composition, as described under items (1) to (15) above, as a sealant, an adhesive, or a coating agent.

(19) Use of a catalyst for cross-linking a silicone rubber material, in particular for cross-linking a silicone rubber material with lactate cross-linker, wherein the catalyst comprises at least two compounds, which are different from each other and which are selected independently of each other from metal salts of carboxylic acids.

(20) A use, as described under item (19) above, characterised in that a metal salt of a carboxylic acid comprises at least one metal cation, which is selected from a cation of bismuth, a cation of calcium, a cation of potassium, a cation of lithium, a cation of magnesium, a cation of sodium, and a cation of zinc.

(21) A use, as described under items (19) or (20) above, characterised in that a metal salt of a carboxylic acid comprises one or more carboxylic acid anions, which are selected from anions of saturated and unsaturated carboxylic acids having six to nineteen carbon atoms, wherein the carboxylic acid comprises a straight-chain or branched hydrocarbon chain.

(22) A use, as described under items (19) to (21) above, characterised in that the catalyst comprises a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, each of one or more branched saturated carboxylic acids having six to nineteen carbon atoms.

(23) A use, as described under item (22) above, characterised in that the ratio of the number of zinc atoms of the zinc salt of a carboxylic acid to the number of the metal atoms of the metal salt of a carboxylic acid is from 2:1 to 1:2, preferably from 1.3:1 to 1:1.3.

(24) A use, as described under items (19) to (23) above, characterised in that the catalyst comprises at least one metal salt of a carboxylic acid, which is selected from bismuth-tris(2-ethylhexanoate), calcium-bis(2-ethylhexanoate), sodium(2-ethylhexanoate), and zinc-bis(2-ethylhexanoate).

(25) A use, as described under items (19) to (24) above, characterised in that the catalyst comprises calcium-bis(2-ethylhexanoate) and zinc-bis(2-ethylhexanoate), preferably in a number ratio of from 1.3:1 to 1:1.3.

(26) A use, as described under items (19) to (24) above, characterised in that the catalyst comprises bismuth-tris (2-ethylhexanoate) and zinc-bis(2-ethylhexanoate), preferably in a number ratio of from 1.3:1 to 1:1.3.
(27) A use, as described under items (19) to (24) above, characterised in that the catalyst comprises sodium (2-ethylhexanoate) and zinc-bis(2-ethylhexanoate), preferably in a number ratio of from 1.3:1 to 1:1.3.
(28) A use, as described under items (19) to (27) above, characterised by additionally using a co-catalyst, which is selected from a basic compound, particularly triethylamine.
(29) A use, as described under items (19) to (28) above, characterised in that, prior to mixing with the catalyst, the at least one organosilicone compound and the at least one cross-linker on the basis of a silane compound having lactate groups were mixed and reacted with each other.
(30) A use, as described under item (29) above, characterised in that the at least one organosilicone compound and the at least one cross-linker on the basis of a silane compound having lactate groups were mixed and reacted with each other under addition of a first catalyst, which is selected from an acid compound, in particular at least one 2-ethylhexylphosphate, and the composition so-obtained was neutralised by addition of a basic compound, preferably triethylamine, prior to the mixing with the catalyst.
(31) A use, as described under items (19) to (30) above, characterised in that the organosilicone compound is an α,ω-dihydroxyl-terminated polyorganosiloxane compound, particularly an α,ω-dihydroxyl-terminated polydialkylsiloxane.
(32) A use, as described under items (19) to (31) above, characterised in that the cross-linker comprises at least one compound, which is selected from the group consisting of methyl-tris(ethyllactato)silane, ethyl-tris(ethyllactato)silane, phenyl-tris(ethyllactato)silane, vinyl-tris(ethyllactato)silane, and tetra(ethyllactato)silane.
(33) A use, as described under items (19) to (32) above, characterised in that 40 to 90% by weight of the organosilane compound, 1 to 15% by weight of the cross-linker, and 0.1 to 5.0% by weight of the catalyst are used.

DETAILED DESCRIPTION OF THE INVENTION

The present invention provides a composition for the production of a silicone rubber material with a cross-linker on the basis of lactate, wherein the composition comprises at least one organosilicone compound, at least one cross-linker on the basis of a silane compound having lactate groups, and a catalyst, particularly a catalyst for the cross-linking of silicone rubber materials with a cross-linker on the basis of lactate, wherein the catalyst comprises at least two compounds, which are different from each other and which are selected independently of each other from metal salts of carboxylic acids. The composition according to the invention can be used for the production of a silicone rubber material, in particular for the production of a silicone rubber material with a cross-linker on the basis of lactate.

The present invention uses a catalyst for the cross-linking of silicone rubber materials with a cross-linker (hardener) on the basis of a silane compound having lactate groups. The catalyst, which is comprised in the composition according to the invention or which is used in the use according to the invention, respectively, comprises at least two compounds, which are different from each other and which are selected independently of each other from metal salts of carboxylic acids.

Thus, the catalyst, which is comprised in the composition according to the invention or which is used in the use according to the invention, respectively, is a mixture of at least two compounds, which are different from each other, preferably a mixture of two to twenty compounds, which are different from each other, further preferred a mixture of two to eight compounds, which are different from each other, and especially preferred a mixture of two or three compounds, which are different from each other.

Especially preferred, the catalyst comprises exactly two metal salts of carboxylic acids, which are different from each other. These are preferably two metal salts of different metals. Especially preferred, the two metal salts of the carboxylic acids are comprised in the catalyst in a ratio of the numbers of the respective metal atoms (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred about 1:1.

Each one of the compounds comprised in the catalyst is a metal salt of one or more carboxylic acids.

Herein, the term "carboxylic acid" means an organic compound, preferably a hydrocarbon, with at least one carboxyl group —COOH. Preferably, a carboxylic acid comprises a hydrocarbon, which comprises from 1 to 25 carbon atoms, preferably from 5 to 20 carbon atoms, and especially preferred from 6 to 19 carbon atoms. The hydrocarbon of the carboxylic acid may be saturated, unsaturated, or aromatic, or may comprise corresponding bonds. The hydrocarbon of the carboxylic acid may comprise a straight-chain or branched hydrocarbon chain, and/or rings of hydrocarbons and/or suitable heteroatoms. Preferably, the carboxylic acid comprises a saturated hydrocarbon (alkane), which comprises a straight-chain or branched hydrocarbon chain. The carboxylic acid may comprise one or more carboxyl groups, preferably one, two, or three carboxyl groups. Especially preferred are mono-carboxylic acids and di-carboxylic acids. In especially preferred di-carboxylic acids, the two carboxyl groups are bound to adjacent carbon atoms. Especially preferred are mono-carboxylic acids.

An especially preferred carboxylic acid is 2-ethylhexanoic acid.

A "metal salt of a carboxylic acid" in the sense of this invention is a compound, which comprises at least one carboxylate anion and at least one metal cation. Therein, carboxylate anion means the anion, which is formed by the deprotonation of a carboxyl group of a carboxylic acid. Thus, a carboxylate anion in the sense of this invention is an organic compound, preferably a hydrocarbon, with at least one carboxylate group —COO⁻, which may be formed from each of the carbon acids described above. The metal cation is a cation of the respective metal, preferably in an oxidation state, which is stable under the conditions of the application. Accordingly, the metal cation preferably has a positive charge of from +1 to +4, further preferred of +1 or +2 or +3. Examples of a monovalent metal cation (charge+1) are $K^+$, $Li^+$, and $Na^+$. Examples of a divalent metal cation (charge+2) are $Ca^{2+}$, $Mg^{2+}$ and $Zn^{2+}$, and an example for a trivalent metal cation (charge+3) is $Bi^{3+}$. For a charge neutral compound, the charge of the metal cation can be compensated by the number of the monovalently negatively charged carboxylate groups in such a manner that the ratio of metal cation to carboxylate group in the metal salt is 1:1, 1:2, 1:3, etc., up to the maximum charge, in dependence of the charge of the metal cation. For example, in the case of mono-carboxylic acids, the ratio of metal to carboxylic acid is 1:1 for monovalent metal cations, 1:2 for divalent metal cations, 1:3 for trivalent metal cations, etc. For dicarboxylic acids having two carboxylate groups, the ratio is adjusted accordingly in such a manner that, for example, the ratio of metal to dicarboxylate may be 1:1 for divalent metal cations, etc. The metal salt may comprise carboxylate anions of a single carboxylic acid, or carboxylate anions of several carboxylic acids, which are different from each other. For example, the metal salt of a divalent metal cation may comprise a carboxylate anion of a first carboxylic acid ($R^1$—COO$^-$) and a carboxylate anion of a second carboxylic acid ($R^2$—COO$^-$), which is different thereof. Apart from metal cation and carboxylate anion(s), the metal salt of a carboxylic acid may also comprise other components, such as, for example, other anions, which are no carboxylate anions, e.g. halogen anions, nitrate anions, sulfate anions, or the like, or neutral molecules, e.g. solvate molecules, or the like.

According to the invention, the catalyst for the cross-linking of silicone rubber materials, which is comprised in the composition according to the invention or which is used in the use according to the invention, respectively, comprises at least two compounds, which are different from each other and which are selected independently to each other from metal salts of carboxylic acids. Thus, the catalyst according to the invention may comprise salts of two or more metals, which are different from each other, and/or two or more carboxylic acids, which are different from each other. Preferably, the catalyst comprises salts of at least two metals, which are different from each other.

Especially preferred, the metal salts of the carboxylic acids in the catalyst are present in a ratio of the numbers of the respective metal atoms (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred of about 1:1.

Surprisingly, it was found that a catalyst for the cross-linking of silicone rubber materials, which comprises at least two mutually different metal salts of carboxylic acids according to the definition given previously, causes especially advantageous product properties in the production of silicone rubber materials, particularly RTV-1 silicone rubber materials using a cross-linker on the basis of lactate. Thus, this catalyst advantageously allows the production of RTV-1 silicone rubber materials, which comprise a cross-linker on the basis of lactate and exploit the numerous, particularly toxicological, advantages of the lactate cross-linkers.

In addition, it was surprisingly found that sealing compounds produced with this catalyst exhibit, in comparison with known tin-containing catalysts, an advantageously faster skin formation time and tack free time. Moreover, they exhibit a higher transparency after cure. Apart from the advantageous toxicological properties, the pleasant smell of the lactate cross-linkers is another general advantage of the compositions according to the invention.

Especially preferred, the catalyst, which is comprised in the composition according to the invention or which is used in the use according to the invention, respectively, comprises a metal salt of a carboxylic acid of at least one metal cation, which is selected from a cation of bismuth, a cation of calcium, a cation of potassium, a cation of lithium, a cation of magnesium, a cation of sodium, and a cation of zinc.

It was found that mixtures, which comprise a Bi, Ca, K, Li, Mg, Na, and/or Zn cation, provide products having especially advantageous properties. Further preferred are mixtures of salts of carboxylic acids, which comprise a Bi, Ca, K, Li, Mg, Na and/or Zn cation, further preferred mixtures, which comprise a Bi, Ca, Na and/or Zn cation, and especially preferred mixtures, which comprise a Bi, Ca and/or Zn cation.

Especially preferred, the catalyst, which is comprised in the composition according to the invention or which is used in the use according to the invention, respectively, comprises a metal salt of a carboxylic acid, which comprises one or more carboxylic acid anions, which are selected from anions of saturated and unsaturated carboxylic acids having six to nineteen carbon atoms, wherein the carboxylic acid preferably comprises a straight-chain or branched hydrocarbon chain.

It was found that products having especially advantageous properties can so be provided. Further preferred are anions of saturated and unsaturated carboxylic acids having six to ten carbon atoms. Further preferred are anions of saturated carboxylic acids with a branched hydrocarbon chain. Especially preferred are anions of a carboxylic acid with a branched hydrocarbon chain of eight carbon atoms. An especially preferred embodiment of a carboxylic acid is 2-ethylhexanoic acid.

Especially preferred, the catalyst, which is comprised in the composition according to the invention or which is used in the use according to the invention, respectively, comprises a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, each of one or more branched saturated carboxylic acids having six to nineteen carbon atoms.

Especially preferred, the metal salts of the carboxylic acids in the catalyst are present in a ratio of the number of the zinc atoms of the zinc salt of a carboxylic acid to the number of the metal atoms of the metal salt of a carboxylic acid (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred of about 1:1.

It was found that products having especially advantageous properties can so be provided.

Further preferred, the catalyst, which is comprised in the composition according to the invention or which is used in the use according to the invention, respectively, comprises a metal salt of a carboxylic acid, which is a zinc salt of one or more branched saturated carboxylic acids having six to nineteen carbon atoms, and a metal salt of a carboxylic acid, which is selected from a bismuth salt and a calcium salt, each of one or more branched saturated carboxylic acids having six to nineteen carbon atoms. Especially preferred, the catalyst comprises a zinc salt of a branched carboxylic acid having six to ten carbon atoms in combination with a bismuth salt of a branched carboxylic acid having six to ten carbon atoms and/or a calcium salt of a branched carboxylic acid having six to ten carbon atoms. In an especially preferred embodiment, the catalyst comprises a zinc salt of a branched carboxylic acid having eight carbon atoms in combination with a bismuth salt of a branched carboxylic acid having eight carbon atoms and/or a calcium salt of a branched carboxylic acid having eight carbon atoms.

Especially preferred, the catalyst, which is comprised in the composition according to the invention or which is used in the use according to the invention, respectively, comprises zinc-bis(2-ethylhexanoate).

It was found that products having especially advantageous properties can be provided with zinc-bis(2-ethylhexanoate).

Especially preferred, the catalyst, which is comprised in the composition according to the invention or which is used in the use according to the invention, respectively, comprises bismuth-tris(2-ethylhexanoate).

It was found that products having especially advantageous properties can be provided with bismuth-tris(2-ethylhexanoate).

Especially preferred, the catalyst, which is comprised in the composition according to the invention or which is used in the use according to the invention, respectively, comprises calcium-bis(2-ethylhexanoate).

It was found that products having especially advantageous properties can be provided with calcium-bis(2-ethylhexanoate).

Especially preferred, the catalyst, which is comprised in the composition according to the invention or which is used in the use according to the invention, respectively, comprises sodium (2-ethylhexanoate).

It was found that products having especially advantageous properties can be provided with sodium (2-ethylhexanoate).

Especially preferred, the catalyst, which is comprised in the composition according to the invention or which is used in the use according to the invention, respectively, comprises a mixture of calcium-bis(2-ethylhexanoate) and zinc-bis(2-ethylhexanoate).

Especially preferred, the catalyst comprises a mixture of calcium-bis(2-ethylhexanoate) and zinc-bis(2-ethylhexanoate) in a ratio of from 1:1 to 1:3 (weight ratio), further preferred in a ratio of from 1:1 to 1:2, and especially preferred of 4:5.

This corresponds to a number ratio of calcium-bis(2-ethylhexanoate) to zinc-bis(2-ethylhexanoate) of from about 1.1:1 to 1:2.8, preferably from about 1.1:1 to 1:1.9, and especially preferred of about 1:1.2.

It was found that products having especially advantageous properties can be provided with a catalyst, which comprises calcium-bis(2-ethylhexanoate) and zinc-bis(2-ethylhexanoate), preferably in the ratio of from 1:1 to 1:3 (weight ratio).

It was found that products having especially advantageous properties can be provided with a catalyst, which comprises calcium-bis(2-ethylhexanoate) and zinc-bis(2-ethylhexanoate), preferably in the ratio of rounded 1:1, particularly from about 1.3:1 to 1:1.3 (number ratios).

Especially preferred, the catalyst, which is comprised in the composition according to the invention or which is used in the use according to the invention, respectively, comprises a mixture of sodium(2-ethylhexanoate) and zinc-bis(2-ethylhexanoate).

Especially preferred, the catalyst comprises a mixture of sodium(2-ethylhexanoate) and zinc-bis(2-ethylhexanoate) in a ratio of from 4:1 to 1:4 (weight ratio), further preferred in a ratio of from 1:1 to 1:3, and especially preferred of 1:2.

This corresponds to a number ratio of sodium(2-ethylhexanoate) to zinc-bis(2-ethylhexanoate) of from about 8.5:1 to 1:1.9, preferably from about 2.1:1 to 1:1.4, and especially preferred of about 1:1.1.

It was found that products having especially advantageous properties can be provided with a catalyst, which comprises sodium(2-ethylhexanoate) and zinc-bis(2-ethylhexanoate), preferably in the ratio of from 4:1 to 1:4 (weight ratio).

It was found that products having especially advantageous properties can be provided with a catalyst, which comprises sodium(2-ethylhexanoate) and zinc-bis(2-ethylhexanoate), preferably in the ratio of rounded 1:1, particularly from about 1.3:1 to 1:1.3 (number ratios).

Especially preferred, the catalyst, which is comprised in the composition according to the invention or which is used in the use according to the invention, respectively, comprises a mixture of bismuth-tris(2-ethylhexanoate) and zinc-bis(2-ethylhexanoate).

Especially preferred, the catalyst comprises a mixture of bismuth-tris(2-ethylhexanoate) and zinc-bis(2-ethylhexanoate) in a ratio of from 4:1 to 1:4 (weight ratio), further preferred in a ratio of from 2:1 to 3:2, and especially preferred of 7:3.

This corresponds to a number ratio of bismuth-tris(2-ethylhexanoate) to zinc-bis(2-ethylhexanoate) of from about 2.2:1 to 1:7.3, preferably from about 1.1:1 to 1:1.7, and especially preferred of about 1.3:1.

It was found that products having especially advantageous properties can be provided with a catalyst, which comprises bismuth-tris(2-ethylhexanoate) and zinc-bis(2-ethylhexanoate), preferably in the ratio of from 4:1 to 1:4 (weight ratio).

It was found that products having especially advantageous properties can be provided with a catalyst, which comprises bismuth-tris(2-ethylhexanoate) and zinc-bis(2-ethylhexanoate), preferably in the ratio of rounded 1:1, particularly from about 1.3:1 to 1:1.3 (number ratios).

Especially preferred, the composition according to the invention additionally comprises a co-catalyst. Further preferred, the co-catalyst is a basic compound. Especially preferred, a basic co-catalyst is an organic tertiary amine compound, for example a trialkylamine, wherein the alkyl radicals comprise independently of each other from one to eight carbon atoms. Examples for especially preferred basic co-catalysts are triethylamine, trioctylamine, and the like. Also preferred basic co-catalysts are basic ion exchange resins having tertiary amine groups, such as, for example, the ones obtainable under the trade name Amberlite IRA-67.

It was found that products having especially preferred properties can be provided with a co-catalyst, which is selected from a basic compound, particularly triethylamine.

The ratio of the basic co-catalyst to the catalyst, which is comprised in the composition according to the invention or which is used in the composition according to the invention, respectively, is preferably from 1:2 to 5:1 (weight ratio), further preferred from 2:3 to 3:1, and especially preferred from 1:1 to 2:1.

Preferably, the composition according to the invention comprises as basic co-catalyst from 0.1 to 0.5% of triethylamine, in relation to the total sealant composition, further preferred from 0.1 to 0.4%, and especially preferred from 0.2 to 0.3%. If an ion exchange resin is used as basic co-catalyst, the composition according to the invention preferably comprises from 0.2 to 1.0% of ion exchange resin, in relation to the total sealant composition, further preferred from 0.3 to 0.8%, and especially preferred from 0.4 to 0.6%.

A composition according to the invention comprises at least one cross-linker on the basis of a silane compound having lactate groups, in particular a silane compound having ethyllactate groups.

Preferably, the cross-linker (hardener) having lactate groups comprises at least one compound having the general formula $Si(R^1)_n R^2_m$ (I), with n=1, 2, 3, or 4, and m=(4-n), wherein the radicals $R^1$ are 2-hydroxy-propionic acid alkyl ester radicals having the general formula —OCH(CH$_3$)COOR, wherein radical R is a straight-chain or branched alkyl radical, optionally substituted, having from 1 to 4 carbon atoms, and wherein the rest(s) $R^2$ is/are selected from the group consisting of a straight-chain or branched alkyl radical, optionally substituted, having at least one carbon atom, a straight-chain or branched alkenyl or alkynyl radical, optionally substituted, each having at least two carbon atoms, a cycloalkyl radical, optionally substituted, having at least three carbon atoms, and an aryl radical, optionally substituted, having at least five carbon atoms.

In general formula (I) the term used to specify the radical R', namely "2-hydroxy-propionic acid alkyl ester radical" means a substituent of the silane compound (I) obtained by condensation of a corresponding silanol compound with a molecule of 2-hydroxy-propionic acid alkyl ester (also referred to as lactic acid alkyl ester or alkyl lactate), a Si—O bond forming between the central silicon atom of the silane compound and the oxygen atom of the free hydroxy function of the 2-hydroxy-propionic acid which is esterified with an alcohol. The 2-hydroxy-propionic acid alkyl ester radical $R^1$ is represented by the general formula —OCH(CH$_3$)COOR, wherein radical R is a straight-chain or branched alkyl radical, optionally substituted, having from 1 to 4 carbon atoms. The alkyl radical R preferably is a methyl, ethyl, propyl, or isopropyl radical, an ethyl radical being especially preferred. Accordingly, the radical $R^1$ preferably is a 2-hydroxy-propionic acid methyl ester radical, a 2-hydroxy-propionic acid ethyl ester radical, a 2-hydroxy-propionic acid propyl ester radical, or a 2-hydroxy-propionic acid isopropyl ester radical. Especially preferred is an $R^1$ radical which is a 2-hydroxy-propionic acid ethyl ester radical (ethyl lactato radical).

Within the meaning of the present invention, the term "2-hydroxy-propionic acid alkyl ester radical" comprises all stereoisomers (enantiomers) of the corresponding 2-hydroxy-propionic acid alkyl ester, especially the pure (R)-2-hydroxy-propionic acid alkyl ester and the pure (S)-2-hydroxy-propionic acid alkyl ester, as well as mixtures thereof, including a racemic mixture. Within the meaning of the present invention, for example, the 2-hydroxy-propionic acid ethyl ester comprises the pure (R)-2-hydroxy-propionic acid ethyl ester (D-(+)-lactic acid ethyl ester) and the pure (S)-2-hydroxy-propionic acid ethyl ester (L-(−)-lactic acid ethyl ester) and mixtures thereof, including a racemic mixture.

In general formula (I), the term "alkyl radical" designates a molecule radical $R^2$ on the basis of a saturated aliphatic hydrocarbon compound. An "alkyl radical having at least one carbon atom" preferably comprises a hydrocarbon compound having from 1 to 8 carbon atoms, further preferred from 1 to 6 carbon atoms, further preferred from 1 to 4 carbon atoms, and especially preferred 1 or 2 carbon atoms. The term "alkyl radical" comprises both straight-chain and branched hydrocarbon chains. Where branching and/or substitutions of the hydrocarbon chain allow the formation of stereo isomers, the term "alkyl radical" comprises not only a racemic mixture but also the pure enantiomers and/or diastereomers, as well as mixtures thereof. It is preferred for the "alkyl radical" to be connected via a Si—C bond to the silane compound of the general formula (I). The term "alkyl radical having at least one carbon atoms" especially comprises a methyl radical, an ethyl radical, a propyl radical, an isopropyl radical, a butyl radical, an isobutyl radical, a sec-butyl radical, and a tert-butyl radical. Especially preferred, the alkyl radical is a methyl radical or an ethyl radical.

The terms "alkenyl radical" and "alkynyl radical" each designate a molecule radical $R^2$ on the basis of a partly unsaturated aliphatic hydrocarbon compound, which comprises at least one C═C double bond in the case of the alkenyl radical and at least one C—C triple bond in the case of the alkynyl radical. It is preferred that an "alkenyl radical having at least two carbon atoms" or an "alkynyl radical having at least two carbon atoms", respectively, comprises from 2 to 8 carbon atoms, further preferred from 2 to 6 carbon atoms, and especially preferred from 2 to 4 carbon atoms. The term "alkenyl radical" or "alkynyl radical", respectively, comprises both straight-chain and branched hydrocarbon chains. Where branching and/or substitutions of the hydrocarbon chain allow the formation of stereo isomers, the term "alkenyl radical" or "alkynyl radical", respectively, comprises not only a racemic mixture but also the pure enantiomers and/or diastereomers, as well as mixtures thereof. It is preferred for the "alkenyl radical" or "alkynyl radical", respectively, to be connected via a Si—C bond to the silane compound of the general formula (I). The term "alkenyl radical having at least two carbon atoms" especially comprises an allyl radical or a vinyl radical, and the term "alkynyl radical" especially comprises an ethynyl radical (acetylene radical). Preferably, the radical $R^2$ in the cross-linker of the general formula (I) is an allyl radical or a vinyl radical, especially preferred a vinyl radical.

The term "cycloalkyl radical" designates a molecule radical $R^2$ on the basis of a cyclic, saturated or partially unsaturated aliphatic hydrocarbon compound. A "cycloalkyl radical having at least three carbon atom" preferably comprises from 3 to 8 carbon atoms, further preferred from 3 to 6 carbon atoms, still further preferred from 4 to 6 carbon atoms, and especially preferred 5 or 6 carbon atoms. The term "cycloalkyl radical" also comprises hydrocarbon rings, which are substituted by straight-chain and/or branched hydrocarbon chains. Where branching and/or substitutions of the hydrocarbon ring allow the formation of stereo isomers, the term "cycloalkyl radical" comprises not only a racemic mixture but also the pure enantiomers and/or diastereomers, as well as mixtures thereof. It is preferred for the "cycloalkyl radical" to be connected via a Si—C bond to the silane compound of the general formula (I). The term "cycloalkyl radical having at least three carbon atoms" especially comprises a cyclopropyl radical, an cyclobutyl radical, a cyclopentyl radical, and a cyclohexyl radical.

In general formula (I), the term "aryl radical" designates a molecule radical $R^2$ on the basis of an aromatic hydrocarbon compound. An "aryl radical having at least five carbon atoms" preferably comprises a an aromatic hydrocarbon compound having from 5 to 12 carbon atoms, further preferred from 6 to 12 carbon atoms, and especially preferred 6 to 10 carbon atoms. In the compound having the general formula (I), the aryl radical having six carbon atoms may also be an unsubstituted phenyl radical according to the above definition. The term "aryl radical" comprises aromatic ring systems having one, two, three, or more rings, which may be connected with each other as well by C—C single bonds as by common edges. It is preferred for the "aryl radical" to be connected via a Si—C bond to the silane compound of the general formula (I). The term "aryl radical having at least five carbon atoms" especially comprises a cyclopentadienyl radical, a phenyl radical, a naphthyl radical, and a diphenyl radical. Especially preferred, the aryl radical is a phenyl radical.

According to the invention, the composition comprises at least one cross-linker of the general formula (I), preferably from 1 to 5 cross-linkers of the general formula (I), further preferred from 1 to 3 cross-linkers of the general formula (I), and especially preferred 2 cross-linkers of the general formula (I).

In an especially preferred embodiment, the cross-linker comprises at least one compound of the general formula (I), which is selected from the group, which consists of methyl-tris(ethyllactato)silane, ethyl-tris(ethyllactato)silane, phenyl-tris(ethyllactato)silane, vinyl-tris(ethyllactato)silane, and tetra(ethyllactato)silane.

A composition according to the invention comprises at least one organosilicone compound, preferably two, three or more different organosilicone compounds. A organosilicone compound comprised in the composition is preferably an oligomeric or polymeric compound. The polymeric organosilicone compound is preferably a difunctional polyorganosiloxane compound, especially preferred an α,ω-dihydroxyl-terminated polyorganosiloxane. More especially preferred are α,ω-dihydroxyl-terminated polydiorganosiloxanes, particularly α,ω-dihydroxyl-terminated polydialkylsiloxanes, α,ω-dihydroxyl-terminated polydialkenylsiloxanes, or α,ω-dihydroxyl-terminated polydiarylsiloxanes. Apart from homopolymeric α,ω-dihydroxyl-terminated polydiorganosiloxanes, heteropolymeric α,ω-dihydroxyl-terminated polydiorganosiloxanes having different organic substituents may also be used, which comprise both copolymers of monomers with similar organic substituents on one silicon atom, and copolymers of monomers with different organic substituents on one silicon atom, e.g. the ones with mixed alkyl, alkenyl and/or aryl substituents. The preferred organic substituents comprise straight-chain and branched alkyl groups having 1 to 8 carbon atoms, particularly methyl, ethyl, n-propyl and iso-propyl, and n-butyl, sec-butyl, and tert-butyl, vinyl, and phenyl. Therein, single or all hydrogen atoms bound to a carbon atom in the individual organic substituents may be substituted by usual substituents, such as halogen atoms or functional groups such as hydroxyl and/or amino groups. Thus, α,ω-dihydroxyl-terminated polydiorganosiloxanes with partly fuorinated or perfluorated organic substituents may be used, or α,ω-dihydroxyl-terminated polydiorganosiloxanes with organic substituents, which are substituted by hydroxyl and/or amino groups, on the silicon atoms.

Especially preferred examples of an organosilicone compound are α,ω-dihydroxyl-terminated polydialkylsiloxanes, such as, e.g., α,ω-dihydroxyl-terminated polydimethylsiloxanes, α,ω-dihydroxyl-terminated polydiethylsiloxanes, or α,ω-dihydroxyl-terminated polydivinylsiloxanes, as well as α,ω-dihydroxyl-terminated polydiarylsiloxanes, such as, e.g., α,ω-dihydroxyl-terminated polydiphenylsiloxanes. Polyorganosiloxanes are preferred, which have a kinematic viscosity of from 5000 to 120000 cSt (at 25° C.), particularly those having a viscosity of from 20000 to 100000 cSt, and especially preferred those having a viscosity of from 40000 to 90000 cSt.

Mixtures of polydiorganosiloxanes having different viscosities may also be used.

It was found that silicone rubber materials having especially advantageous properties can be obtained, if, prior to mixing with the catalyst, the at least one organosilicone compound and the at least one cross-linker on the basis of a silane compound having lactate groups were mixed and reacted with each other in a preceding first step.

Correspondingly, a preferred composition according to the invention is produced by a method according to the invention, in which at least one organosilicone compound and at least one cross-linker on the basis of a silane compound having lactate groups are mixed and reacted with each other in a first step, prior to mixing the so-obtained composition with a catalyst in a subsequent step, wherein the catalyst comprises at least two compounds, which are different from each other and which are independently to each other selected from metal salts of carboxylic acids.

Preferably, the at least one organosilicone compound and the at least one cross-linker on the basis of a silane compound having lactate groups are reacted under addition of a first catalyst in the first step. Preferably, the first catalyst is selected from an acid compound. Acid compounds, which are suitable as catalyst for the first reaction step (also referred to as pre-reaction or pre-polymerization reaction in the context of this application), are, for example, organic acids or esters of inorganic acids with organic radicals. Preferred acid compounds are acid esters of phosphoric acid with alkylalcohols, wherein the alkyl radicals preferably comprise from one to eight carbon atoms. Especially preferred, an acid catalyst for the pre-reaction is at least one 2-ethylhexylphosphate. 2-Ethylhexylphosphate designates an ester of 2-ethylhexanol and ortho-phosphoric acid. Preferred esters are a mono-ester, a di-ester, and a mixture thereof. More especially preferred, an acid catalyst for the pre-reaction is a mixture of a mono-ester and a di-ester, such as, for example, mono(2-ethylhexyl)phosphate and di(2-ethylhexyl)phosphate, preferably in the ratio of 1:1.

Preferably, from 0.02 to 0.10% of the acid catalyst for the pre-reaction are used, in relation to the total sealant composition, further preferred from 0.03 to 0.08%, and especially preferred from 0.05 to 0.07%.

Preferably, the pre-reaction is carried out under exclusion of air and humidity (water). Especially preferred, the individual components are mixed with each other under the exclusion of air and humidity, for example under a protective gas, such as, e.g., argon. The pre-reaction also may be carried out under reduced pressure (vacuum), wherein a reduced pressure preferably is from 50 to 200 mbar. Preferably, the pre-reaction is carried out at a temperature of from room temperature to 60° C. Preferable, the mixture is moved during the pre-reaction, e.g. by stirring. The pre-reaction is preferably carried out for ten minutes or more.

It is assumed that the pre-reaction between the at least one organosilicone compound and the at least one cross-linker on the basis of a silane compound having lactate groups leads to the formation of hetero-dimers or hetero-oligomers, respectively, which leads to a minute change in the viscosity of the mixture. However, the composition, which is obtained as product of the pre-reaction, is still liquid and can be worked further.

Preferably, the pre-reaction is stopped by neutralisation. A neutralisation is preferably carried out by addition of a basic compound, wherein it is especially preferred that a basic compound, which can also act as a basic co-catalyst, is added in excess. Especially preferred, triethylamine is used for neutralising.

In an especially preferred embodiment, the at least one organosilicone compound and the at least one cross-linker on the basis of a silane compound having lactate groups are mixed and reacted with each other under addition of an acid catalyst for the pre-reaction, which is selected from an acid compound, particularly at least one 2-ethylhexylphosphate, and the so-obtained composition is then neutralised by adding a basic compound, preferably triethylamine, prior to mixing with the catalyst, which comprises at least two compounds, which are different from each other and which are independently of each other selected from metal salts of carboxylic acids.

It was found that the composition according to the invention may be stored for periods of more than 12 months under exclusion of moisture, and that it polymerizes under the influence of water or humidity of the air at room temperature.

In the presence of water or humidity of the air, the components cross-linker (hardener) and organosilicone compound of the composition according to the invention polymerize or condense, respectively, to silicone rubber materials by forming Si—O—Si bonds. It is advantageous that, when cross-linking (curing) to a silicone rubber material, the composition according to the invention only releases alkyl ester of 2-hydroxypropionic acid, such as, for example, ethyl ester of 2-hydroxypropionic acid (ethyllactate), which, in contrast to oxime compounds, such as, e.g., butan-2-one oxime, is harmless from a health point of view, which is not corrosive nor aggressive against materials such as metals, mortar, or stone (marble etc.), and which has a pleasant smell. The polymerization products, which are produced by using the composition according to the invention, are free of specks and spots, transparent, and clear. Thus, the composition according to the invention can be used as sealant, adhesive, coating agent, or the like.

Especially preferred, the composition according to the invention comprises 40 to 90% by weight of the organosilicone compound, 1 to 15% by weight of the cross-linker, and 0.1 to 5.0% by weight of the catalyst, further preferred 0.5 to 2.0% by weight of the catalyst, wherein the remainder is made up by usual additives.

If desired, the composition according to the invention may comprise further usual additives. Usual additives are fillers, colorants, softeners, thixotropic agents, wetting agents, adhesion promoters, catalysts, and others.

Both reinforcing as well as non-reinforcing fillers may be used as fillers. The preferred fillers are inorganic fillers, for instance, highly disperse, pyrogenic, or precipitated silicic acids, carbon black, quartz powder, chalk, or metal salts or metal oxides, such as e.g. titanium oxides. An especially preferred filler is a highly disperse silicic acid, for example, a commercial filler obtainable from Cabot under the name of Cabosil 150. Fillers like highly disperse silicic acids, especially pyrogenic silicic acids, are also useful as thixotropic agents. Metal oxides are useful also as colorants; titanium oxides, for example, as a white colorant. Moreover, the fillers may be surface modified by known methods, for example, silicic acids made hydrophobic with silanes can be used.

Suitable softeners are per se known polydiorganosiloxanes without functional terminal groups, which are therefore different from the organosilicone compounds used according to the invention. And/or liquid aliphatic or aromatic hydrocarbons may be used, preferably those having molecular weights from about 50 to about 5000, whose volatility is low and which are sufficiently compatible with polysiloxanes. The preferred kinematic viscosity of softeners is from 1 to 5000 cSt (at 25° C.), in particular from 50 to 500 cSt, especially preferred being from 90 to 200 cSt. Examples of softeners comprise polydimethylsiloxanes having a viscosity of from 90 to 120 cSt, especially of 100 cSt, paraffin oils, and polysubstituted alkylbenzenes.

The preferred wetting agents and/or adhesion promoters (coupling agents) used are per se known silane compounds with organic substituents carrying reactive groups on the silicon atom, which differ from the organosilicone compounds used according to the invention, such as e.g. organosilanes having reactive amine groups, carboxylic acid groups, epoxy groups, or thiol groups. Among the preferred examples there are aminosilanes, such as aminoethyl-aminopropyl-trialkoxysilane. Concrete examples of especially preferred adhesion promoters (coupling agents) are 3-aminopropyl-triethoxysilane, 3-aminopropyl-trimethoxysilane, aminoethyl-aminopropyl-trimethoxysilane, butylaminopropyl-triethoxysilane, butylaminopropyl-trimethoxysilane, propylaminopropyl-triethoxysilane, propylaminopropyl-trimethoxysilane, N-cyclohexyl-3-aminopropyl-trimethoxysilane, N-cyclohexyl-3-aminopropyl-triethoxysilane, and co-oligomeric diamino/alkyl functional silanes, which is commercially available as Dynasylan 1146 from Degussa. Other oligomeric coupling agents also may be used.

In another aspect, the present invention provides a use of the composition according to the invention as sealant, adhesive, coating agent, or the like. The composition finds preferred application in the construction sector, specifically as a sealant or adhesive, especially for joints in buildings and civil engineering projects, for glass elements and windows (preferred) and in sanitary installations. Mechanical engineering likewise is open for use of the composition, e.g. the motor vehicle sector (preferred), electronics and textile industries, and industrial plants and installations.

According to the desired application, the composition according to the invention as a RTV silicone rubber material can be applied to any substrate, where the composition then polymerizes at room temperature under the influence of water or humidity of the air. For example, in the use thereof as a sealant, the composition according to the invention is introduced into a joint to be sealed or the like. In the use of the composition according to the invention as an adhesive, the composition is applied to one or both of the parts to be connected, and those are then joined. The composition according to the invention is distinguished by an excellent adhesion to all important materials, such as, for example, wood, varnished wood, glazed wood, aluminium, powder-coated aluminium, glass, PVC, polyamide, steel, concrete, and many other materials. The obtained polymer is transparent, and has an advantageous elasticity and hardness. Moreover, the composition according to the invention is distinguished by a short skin formation time, tack free time, and early strain. Moreover, the composition according to the invention has advantageous toxicological properties and a pleasant smell. In addition, the composition according to the invention has advantageous storage properties within the cartridge.

In another aspect, the present invention provides a use of a catalyst for cross-linking a silicone rubber material, especially of a silicone rubber material with lactate cross-linker, wherein the catalyst comprises at least two compounds, which are different from each other and which are selected independently of each other from metal salts of carboxylic acids.

The catalyst used in the use according to the invention has been described in detail above.

Preferably, a catalyst is used, which comprises at least one metal salt of a carboxylic acid, which is selected from bismuth-tris(2-ethylhexanoate), calcium-bis(2-ethylhexanoate), sodium(2-ethylhexanoate), and zinc-bis(2-ethylhexanoate).

Especially preferred, the catalyst used comprises calcium-bis(2-ethylhexanoate) and zinc-bis(2-ethylhexanoate), preferably in a number ratio of from 1.3:1 to 1:1.3.

Especially preferred, the catalyst used comprises bismuth-tris(2-ethylhexanoate) and zinc-bis(2-ethylhexanoate), preferably in a number ratio of from 1.3:1 to 1:1.3.

Especially preferred, the catalyst used comprises sodium (2-ethylhexanoate) and zinc-bis(2-ethylhexanoate), preferably in a number ratio of from 1.3:1 to 1:1.3.

Especially preferred, the catalyst is used together with a co-catalyst, as described in detail above. Further preferred, the co-catalyst is selected from a basic compound, particularly from a trialkylamine, and especially preferred triethylamine.

It was found that polymerization products having especially desired properties are formed by the simultaneous use of a co-catalyst.

Preferably, the ratio of the basic co-catalyst to the catalyst, which are used together in the composition according to the invention, is from 1:2 to 5:1 (weight ratio), further preferred from 2:3 to 3:1, and especially preferred from 1:1 to 2:1.

Preferably, from 0.1 to 0.5% of trialkylamine, in relation to the total sealant composition, are used as basic co-catalyst, further preferred from 0.1 to 0.4%, and especially preferred from 0.2 to 0.3%. If an ion exchange resin is used as the basic co-catalyst, from 0.2 to 1.0% of ion exchange resin are used, in relation to the total sealant composition, further preferred from 0.3 to 0.8%, and especially preferred from 0.4 to 0.6%.

Especially preferred, the catalyst is used for cross-linking a silicone rubber material with lactate cross-linker, which comprises at least one organosilicone compound and at least one lactate cross-linker, wherein the compounds described above are preferably used as the at least one organosilicone compound and the at least one cross-linker.

Especially preferred, the organosilicone compound used comprises an α,ω-dihydroxyl-terminated polyorganosiloxane compound, particularly an α,ω-dihydroxyl-terminated polydialkylsiloxane.

Especially preferred, the cross-linker used comprises at least one compound, which is selected from the group that consists of methyl-tris(ethyllactato)silane, ethyl-tris(ethyllactato)silane, phenyl-tris(ethyllactato)silane, vinyl-tris(ethyllactato)silane, and tetra(ethyllactato)silane.

Especially preferred, the at least one organosilicone compound and the at least one cross-linker on the basis of a silane compound having lactate groups are mixed and reacted with each other, prior to mixing with the catalyst, which comprises two compounds, which are different from each other and are selected independently of each other from metal salts of carboxylic acids, preferably under addition of a first catalyst, as it is described in detail in the above. In particular, the first catalyst for the pre-reaction is selected from an acid compound, and, especially preferred, at least one 2-ethylhexylphosphate is used as the first catalyst for the pre-reaction. In an especially preferred embodiment, prior to mixing with the catalyst, the at least one organosilicone compound and the at least one cross-linker on the basis of a silane compound having lactate groups are mixed and reacted with each other under addition of the first catalyst, and the so-obtained composition is then neutralised by addition of a basic compound, preferably triethylamine, prior to mixing with the catalyst.

Preferably, from 0.02 to 0.10% of the acid catalyst are used, in relation to the total sealant composition, further preferred from 0.03 to 0.08%, and especially preferred from 0.05 to 0.07%.

Especially preferred, 0.1 to 5.0% by weight of the catalyst, which comprises at least two compounds, which are different from each other and which are selected independently of each other from metal salts of carboxylic acids, are used with 40 to 90% by weight of the organosilicone compound and 1 to 15% by weight of the cross-linker.

By the inventive use of the described catalyst, a cross-linking of a silicone rubber material with lactate cross-linker can be advantageously controlled according to a desired application in such a manner that polymerization products having desired properties are formed.

EXAMPLES

In the examples and comparative examples, the following metal salts of carboxylic acids are used, which are available, for example, from Gelest (Morrisville, USA).

As calcium salt of carboxylic acids, calcium-bis(2-ethylhexanoate) is used, which is classified under the CAS-No. 68409-80-3.

As lithium salt of carboxylic acids, lithium (2-ethylhexanoate) is used, which is classified under the CAS-No. 15590-62-2.

As strontium salt of carboxylic acids, strontium-bis(2-ethylhexanoate) is used, which is classified under the CAS-No. 2457-02-5.

As zinc salt of carboxylic acids, zinc-bis(2-ethylhexanoate) is used, which is classified under the CAS-No. 85203-81-2.

The further chemicals, which are used in the examples and comparative examples, are obtainable, for example, from the producers named in the following:

Polydimethylsiloxane (800000 cSt) from Wacker Chemie, Burghausen, Germany;

Polymethylsiloxane (100 cSt) from Dow Corning, Seneffe, Belgium;

Filler (highly disperse silicic acid) from Cabot Rheinfelden, Germany;

Aminopropyltriethoxysilane from Nitrochemie Aschau GmbH, Germany;

Coupling agent (dimethylaminopropyl-trimethoxysilane) from Nitrochemie Aschau GmbH, Germany;

Co-catalyst (triethylamine) from Nitrochemie Aschau, Germany;

Mixtures of cross-linkers from Nitrochemie Aschau GmbH, Germany.

Measurement of the Product Properties of the Produced Sealants

The product properties skin formation time, tack free time, early strain, complete cure, appearance, and Shore-hardness A were determined for all produced sealants according to usual methods (cf. e.g. "Praxishandbuch Dichtstoffe" by Industrieverband Dichtstoffe e.V., $3^{rd}$ edition 1990). All measurements were carried out at conditions of 23° C. and 50% humidity.

For the determination of the skin formation time, the time was measured, at which a complete layer of solidified material (skin) was detected on the surface of a sample strand.

For the determination of the tack free time (German: "Klebfreizeit"), the time was measured, at which the surface of a sample strand no longer exhibits tackiness.

For the determination of the early strain, a silicone strip having a height of 10 mm was applied to a sheet metal strip. The resilience (strain) is tested by bending the strip by 90°. The time is recorded, at which the skin of the silicone strip does not crack.

For the determination of the complete cure, the sealant is applied to a glass plate with a height of 4 mm, and the time period is measured until complete curing to the glass plate.

For the determination of the surface cross-linking (notch strength), a strip of sealing compound having a height of 10 mm is applied to a glass plate. After 24 hours at standard conditions (21 to 25° C.; 40 to 60% humidity), a notch is pressed into the surface. After 10 seconds, it is tested whether the notch is reversible.

Appearance is determined by organo-leptic tests.

The Shore-hardness A was determined using a measuring device "Zwick-Roell-Messgerät" (Bez.: ASTM D 2240;

DIN 53505; ISO 868). The respective sample of sealing compound was applied with an application height of 10 mm and kept for 7 days at standard conditions (23° C./50% humidity). The measurement was then carried out after 7 days of storage at standard conditions.

Example 1

Production of Catalyst A

A catalyst A according to the invention is produced, which comprises calcium and zinc salts of carboxylic acids.

For catalyst A, calcium-bis(2-ethylhexanoate) and zinc-bis(2-ethylhexanoate) are mixed in a ratio of 4:5 (weight ratio).

Example 2

Production of Silicone Rubber Basic Mixture 1

Under exclusion of air and humidity, a silicone rubber basic mixture 1 is produced as described below according to the following formulation:

| | |
|---|---|
| 480.0 g | of α,ω-dihydroxyl-terminated polydimethylsiloxane having a viscosity of 80000 cSt |
| 354.0 g | of polydimethylsiloxane having a viscosity of 100 cSt |
| 56.2 g | of a cross-linker mixture of 28.1 g of tetra(ethyllactato)silane and 28.1 g of vinyl-tris(ethyllactato)silane |
| 0.5 g | of ethylhexylphosphate (catalyst for pre-reaction) |

The components of the basic mixture are stirred under vacuum for 10 minutes in order to obtain a pre-polymer (reaction product of hydroxyl-terminated polydimethylsiloxane and silanes) by a pre-cross-linking (pre-reaction) catalysed by ethylhexylphosphate.

After ten minutes, the obtained pre-polymer is further processed to sealants under exclusion of air and humidity in the Examples and Comparative Examples described below.

Example 3

Production of Silicone Rubber Basic Mixture 2

Under exclusion of air and humidity, a silicone rubber basic mixture 1 is produced as described below according to the following formulation:

| | |
|---|---|
| 480.0 g | of α,ω-dihydroxyl-terminated polydimethylsiloxane having a viscosity of 80000 cSt |
| 354.0 g | of polydimethylsiloxane having a viscosity of 100 cSt |
| 56.2 g | of a cross-linker mixture of 16.9 g of tetra(ethyllactato)silane and 39.3 g of vinyl-tris(ethyllactato)silane |
| 0.5 g | of ethylhexylphosphate (catalyst for pre-reaction) |

The components of the basic mixture are stirred under vacuum for 10 minutes in order to obtain a pre-polymer (reaction product of hydroxyl-terminated polydimethylsiloxane and silanes) by a pre-cross-linking (pre-reaction) catalysed by ethylhexylphosphate. After ten minutes, the obtained pre-polymer is further processed to sealants under exclusion of air and humidity in the Examples and Comparative Examples described below.

Comparative Example 1

Sealant Formulation 1 with Zinc Catalyst

To the silicone rubber basic mixture 1 produced in Example 2, 2.0 g of zinc-bis(2-ethylhexanoate) as a catalyst and the following additives are added, and the composition is mixed:

| | |
|---|---|
| 88.0 g | of highly disperse silicic acid (filler) |
| 15.0 g | of coupling agent (reaction product of OH-polymer and dimethylaminopropyl-trimethoxysilane) |
| 3.0 g | of aminopropyltriethoxysilane (thixotrophic agent) |
| 2.0 g | of triethylamine (co-catalyst) |

The silicone rubber mixture obtained is filled into ordinary cartridges and examined as described.

The sealant exhibits after exposure to air:
a skin formation time of 7 min
a tack free time of 15 min
an early strain after 60 min
a complete cure after 24 h (notch strength)
a transparent appearance
a Shore-hardness A of 24

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the sealant only reaches a Shore-hardness A of 14 after 7 days of cure under exposure to air. Moreover, a yellowing of the sealant is observed.

Comparative Example 2

Sealant Formulation 2 with Lithium Catalyst

To the silicone rubber basic mixture 2 produced in Example 3, 2.0 g of lithium 2-ethylhexanoate as a catalyst and the following additives are added, and the composition is mixed:

| | |
|---|---|
| 88.0 g | of highly disperse silicic acid (filler) |
| 15.0 g | of coupling agent (reaction product of OH-polymer and dimethylaminopropyl-trimethoxysilane) |
| 3.0 g | of aminopropyltriethoxysilane (thixotrophic agent) |
| 2.0 g | of triethylamine (co-catalyst) |

The silicone rubber mixture obtained is filled into ordinary cartridges and examined as described.

The sealant exhibits after exposure to air:
a skin formation time of 5 min
a tack free time of 15 min
an early strain after 50 min
a complete cure after 24 h (notch strength)
a transparent appearance
a Shore-hardness A of 24

Moreover, it was found that the sealant has a good adhesion to aluminium, powder-coated aluminium, glass, PVC, and steel. In contrast, the adhesion to wood, varnished wood, glazed wood, polyamide, and concrete is only bad.

Further, the sealant has an insufficient storage stability within the cartridge. Already after 4 weeks of storage at 60° C. within the cartridge, the following parameters have deteriorated:

Shore-hardness A after 7 days of exposure to air is only 16
strong yellowing of the sealant
bad adhesion to most substrates
no complete cure after 24 h (notch strength)

Comparative Example 3

Sealant Formulation 2 with Strontium Catalyst

To the silicone rubber basic mixture 1 produced in Example 2, 2.0 g of strontium-bis(2-ethylhexanoate) as a catalyst and the following additives are added, and the composition is mixed:

| | |
|---|---|
| 88.0 g | of highly disperse silicic acid (filler) |
| 15.0 g | of coupling agent (reaction product of OH-polymer and dimethylaminopropyl-trimethoxysilane) |
| 3.0 g | of aminopropyltriethoxysilane (thixotrophic agent) |
| 2.0 g | of triethylamine (co-catalyst) |

The silicone rubber mixture obtained is filled into ordinary cartridges and examined as described.
The sealant exhibits after exposure to air:
a skin formation time of 5 min
a tack free time of 15 min
an early strain after 50 min
a complete cure after 24 h (notch strength)
a transparent appearance
a Shore-hardness A of 24
Moreover, it was found that the sealant has a good adhesion to aluminium, powder-coated aluminium, glass, PVC, and steel. In contrast, the adhesion to wood, varnished wood, glazed wood, polyamide, and concrete is only bad.
Further, the sealant has an insufficient storage stability within the cartridge. Already after 4 weeks of storage at 60° C. within the cartridge, the following parameters have deteriorated:
Shore-hardness A after 7 days of exposure to air is only 16
strong yellowing of the sealant
bad adhesion to most substrates
no complete cure after 24 h (notch strength)
It is apparent from Comparative Examples 1 to 3 that, with the known tin-free catalysts, it is not possible to produce a sealant with lactate cross-linkers, which has good product properties. Particularly, the sealing compounds produced with the known tin-free catalysts have a bad adhesion to many materials as well as an insufficient storage stability.

Example 4

Sealant Formulation 1 with Catalyst According to Invention (Ca+Zn)

To the silicone rubber basic mixture 1 produced in Example 2, 2.0 g of catalyst A (from Example 1) and the following additives are added, and the composition is mixed:

| | |
|---|---|
| 88.0 g | of highly disperse silicic acid (filler) |
| 15.0 g | of coupling agent (reaction product of OH-polymer and dimethylaminopropyl-trimethoxysilane) |
| 3.0 g | of aminopropyltriethoxysilane (thixotrophic agent) |
| 2.0 g | of triethylamine (co-catalyst) |

The silicone rubber mixture obtained is filled into ordinary cartridges and examined as described.
The sealant exhibits after exposure to air:
a skin formation time of 7 min
a tack free time of 16 min
an early strain after 60 min
a complete cure after 24 h (notch strength)
a transparent appearance
a Shore-hardness A of 20
Moreover, it was found that the sealant has a good adhesion to wood, varnished wood, glazed wood, aluminium, powder-coated aluminium, glass, PVC, polyamide, steel, concrete, and many other materials.
Further, the sealant is distinguished by its excellent storage stability within the cartridge. After 4 weeks of storage at 60° C. within the cartridge, the sealant still has the same properties as at the time of the first exposure.

Example 5

Sealant Formulation 2 with Catalyst According to Invention (Ca+Zn)

To the silicone rubber basic mixture 2 produced in Example 2, 2.0 g of catalyst A (from Example 1) and the following additives are added, and the composition is mixed:

| | |
|---|---|
| 88.0 g | of highly disperse silicic acid (filler) |
| 15.0 g | of coupling agent (reaction product of OH-polymer and dimethylaminopropyl-trimethoxysilane) |
| 3.0 g | of aminopropyltriethoxysilane (thixotrophic agent) |
| 2.0 g | of triethylamine (co-catalyst) |

The silicone rubber mixture obtained is filled into ordinary cartridges and examined as described.
The sealant exhibits after exposure to air:
a skin formation time of 10 min
a tack free time of 25 min
an early strain after 70 min
a complete cure after 24 h (notch strength)
a transparent appearance
a Shore-hardness A of 21
Moreover, it was found that the sealant has a good adhesion to wood, varnished wood, glazed wood, aluminium, powder-coated aluminium, glass, PVC, polyamide, steel, concrete, and many other materials.
Further, the sealant is distinguished by its excellent storage stability within the cartridge. After 4 weeks of storage at 60° C. within the cartridge, the sealant still has the same properties as at the time of the first exposure.
In contrast to the sealants produced in the Comparative Examples 1 to 3, the sealants with lactate cross-linkers prepared with catalyst A according to the invention are not only distinguished by excellent product properties, but also by an excellent storage stability, independent of the cross-linkers used in the sealant formulations 1 and 2.

The invention claimed is:
1. A composition, comprising
at least one organosilicone compound,
at least one cross-linker comprising a silane compound having lactate groups, and
a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carboxylic acids having six to nineteen carbon atoms.

2. A composition, according to claim 1, wherein the ratio of the number of zinc atoms of the zinc salt of a carboxylic acid to the number of the metal atoms of the metal salt of a carboxylic acid is from 2:1 to 1:2.

3. A composition, according to claim 1, comprising at least one metal salt of a carboxylic acid, which is selected from the group consisting of bismuth-tris(2-ethylhexanoate), Calcium-bis 2-ethylhexanoate sodium(2-ethylhexanoate), and zinc-bis(2-ethylhexanoate).

4. A composition, according to claim 1 comprising calcium-bis(2-ethylhexanoate) and zinc-bis(2-ethylhexanoate).

5. A composition, according to claim 1, comprising bismuth-tris(2-ethylhexanoate) and zinc-bis(2-ethylhexanoate).

6. A composition, according to claim 1, comprising sodium(2-ethylhexanoate) and zinc-bis(2-ethylhexanoate).

7. A composition, according to claim 1 further comprising a co-catalyst, which is selected from a basic compound.

8. A composition, according to claim 1, wherein, prior to mixing with the catalyst, the at least one organosilicone compound and the at least one cross-linker on the basis of a silane compound having lactate groups are mixed and reacted with each other.

9. A composition, according to claim 8, wherein the at least one organosilicone compound and the at least one cross-linker on the basis of a silane compound having lactate groups are mixed and reacted with each other under addition of a first catalyst, which is selected from an acid compound, and that the composition so-obtained is neutralised by addition of a basic compound, prior to the mixing with the catalyst.

10. A composition, according to claim 1, wherein the organosilicone compound comprises an $\alpha,\omega$-dihydroxyl-terminated polydialkylsiloxane.

11. A composition, according to claim 1, wherein the cross-linker comprises at least one compound, which is selected from the group consisting of methyl-tris(ethyllactato)silane, ethyl-tris(ethyllactato)silane, phenyl-tris(ethyllactato)silane, vinyl-tris(ethyllactato)silane, and tetra(ethyllactato)silane.

12. A composition, according to claim 1 comprising 40 to 90% by weight of the organosilicone compound, 1 to 15% by weight of the cross-linker, and 0.1 to 5.0% by weight of the catalyst.

13. A method for the production of a composition according to claim 1, wherein, in a first step, at least one organosilicone compound and at least one cross-linker on the basis of a silane compound having lactate groups are mixed and reacted with each other, preferably under addition of a first catalyst, which is selected, from an acid compound, in particular at least one 2-ethylhexylphosphate, prior to mixing the so-obtained composition with a catalyst in a subsequent step, wherein the catalyst comprises at least two compounds, which are different from each other and which are selected independently of each other from metal salts of carboxylic acids.

14. A method according to claim 13, wherein the composition, which is obtained by reaction of the at least one organosilicone compound and the at least one cross-linker on the basis of a silane compound having lactate groups under addition of a first catalyst, is neutralized by addition of a basic compound, preferably triethylamine, prior to mixing with the catalyst.

15. A method of using a composition comprising the steps of
(a) providing a composition formed from the following steps:
providing at least one organosilicone compound;
providing at least one cross-linker comprising a silane compound having lactate groups;
providing a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carhoxylic acids having six to nineteen carbon atoms;
mixing the organosilicone compound, the cross-linker, and the catalyst to form a composition; and
(b) using the composition for purpose selected from the group consisting of as a as a sealant, an adhesive, and a coating agent.

16. A method for cross-linking a silicone rubber material using a catalyst comprising the steps of:
providing a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carboxylic acids having six to nineteen carbon atoms; and
mixing an organosilicone compound, a cross-linker, and the catalyst to form a composition.

17. A method for cross-linking a silicone rubber material using a catalyst according to claim 16, wherein the ratio of the number of zinc atoms of the zinc salt of a carboxylic acid to the number of the metal atoms of the metal salt of a carboxylic acid is from 2:1 to 1:2.

18. A method crosslinking a silicone rubber material using a catalyst according to claim 16, wherein the catalyst comprises at least one metal salt of a carboxylic acid, which is selected from the group consisting of bismuth-tris(2-ethylhexanoate), Calcium-bis(2-ethylhexanoate sodium(2-ethylhexanoate), and zinc-bis(2-ethylhexanoate).

19. A method for cross-linking a silicone rubber material using a catalyst according to claim 16, wherein the catalyst comprises calcium-bis(2-ethylhexanoate) and zinc-bis(2-ethylhexanoate).

20. A method for cross-linking a silicone rubber material using a catalyst according to claim 16, wherein the catalyst comprises bismuth-tris(2-ethylhexanoate) and zinc-bis(2-ethylhexanoate), preferably in a number ratio of from 1.3:1 to 1:1.3.

21. A method for cross-linking a silicone rubber material using a catalyst according to claim 16, wherein the catalyst comprises sodium(2-ethylhexanoate) and zinc-bis(2-ethylhexanoate).

22. A method for cross-linking a silicone rubber material using a catalyst according to claim 16, additionally using a co-catalyst, which is selected from a basic compound.

23. A method for cross-linking a silicone rubber material using a catalyst according to claim 16, wherein prior to mixing with the catalyst, the at least one organosilicone compound and the at least one cross-linker on the basis of a silane compound having lactate groups were mixed and reacted with each other.

24. A method for cross-linking a silicone rubber material using a catalyst according to claim 23, wherein the at least one organosilicone compound and the at least one cross-linker on the basis of a silane compound having lactate groups are mixed and reacted with each other under addition of a first catalyst, which is selected from an acid compound, and the so-obtained composition was neutralised by addition of a basic compound, prior to the mixing with the catalyst.

25. A method for cross-linking a silicone rubber material using a catalyst according to claim 16, wherein the organosilicone compound is an α,ω-dihydroxyl-terminated polydialkylsiloxane.

26. A method for cross-linking a silicone rubber material using a catalyst according to claim 16, wherein the cross-linker comprises at least one compound, which is selected from the group consisting of methyl-tris(ethyllactato)silane, ethyl-tris(ethyllactato)silane, phenyl-tris(ethyllactato)silane, vinyl-tris(ethyllactato)silane, and tetra(ethyllactato)silane.

27. A method for cross-linking a silicone rubber material using a catalyst according to claim 16, wherein 40 to 90% by weight of the organosilane compound, 1 to 15% by weight of the cross-linker, and 0.1 to 5.0% by weight of the catalyst are used.

* * * * *